June 26, 1956      F. L. BRYANT      2,752,068
LIQUID DISPENSING DEVICES
Filed May 3, 1952      2 Sheets-Sheet 1
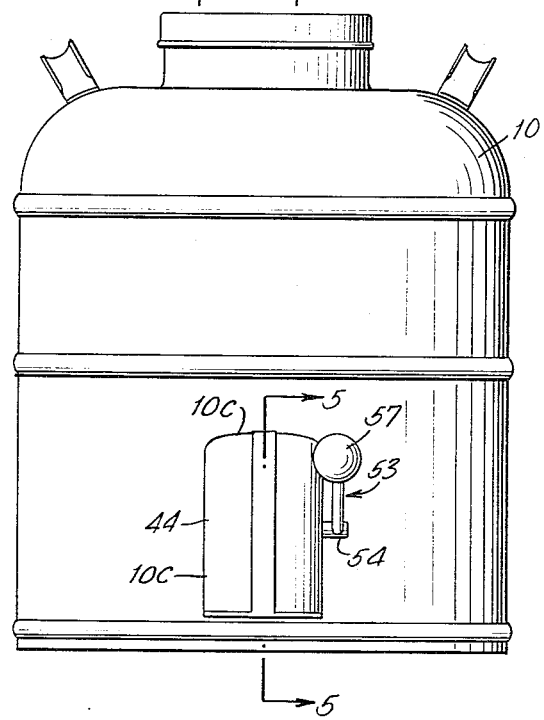
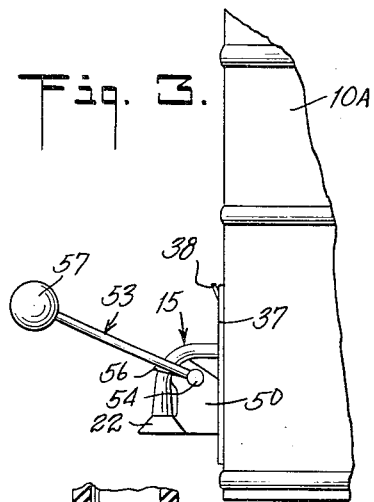
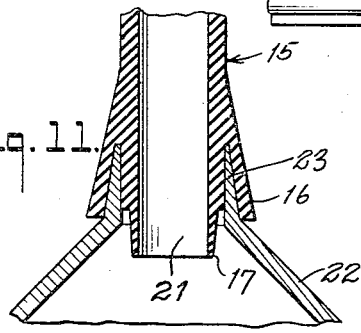
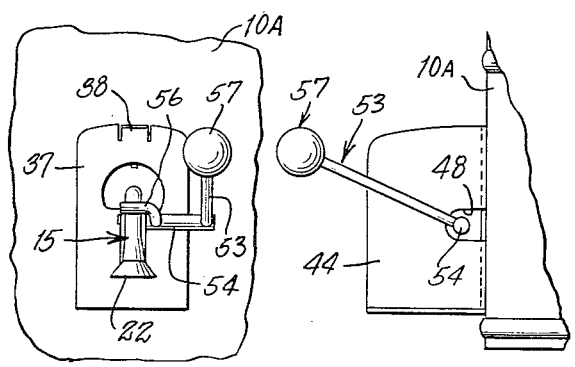
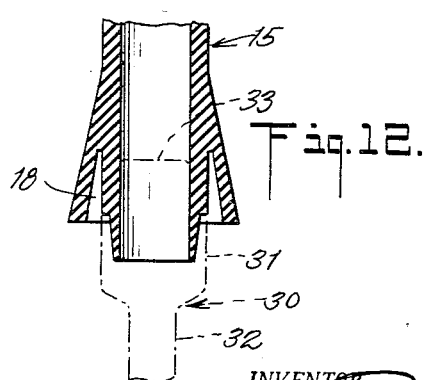
INVENTOR.
Forrest L. Bryant

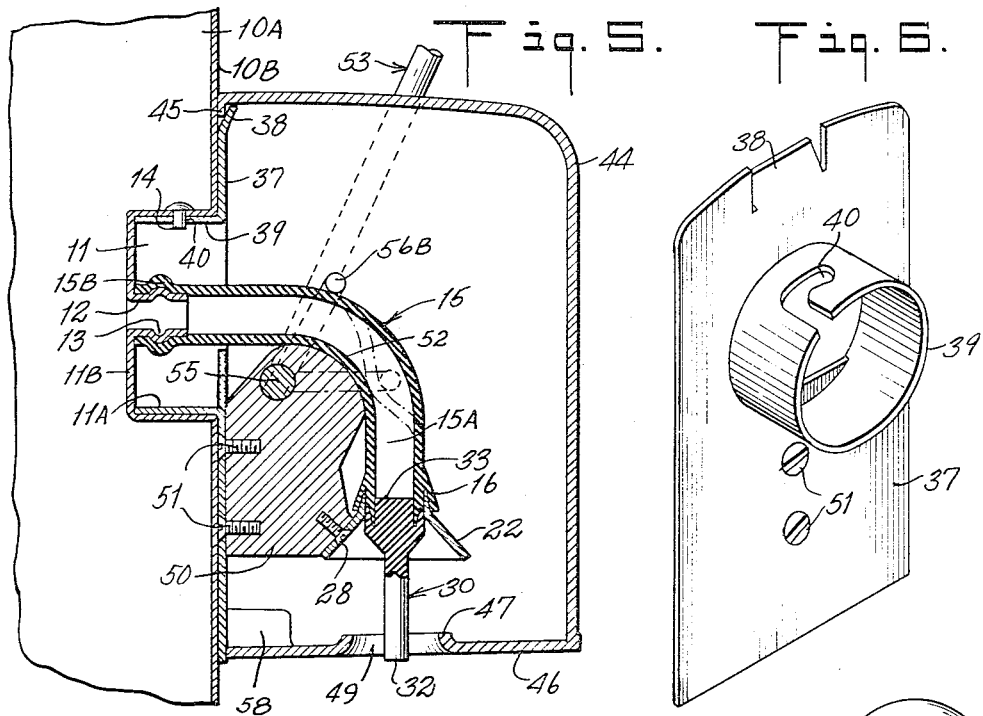
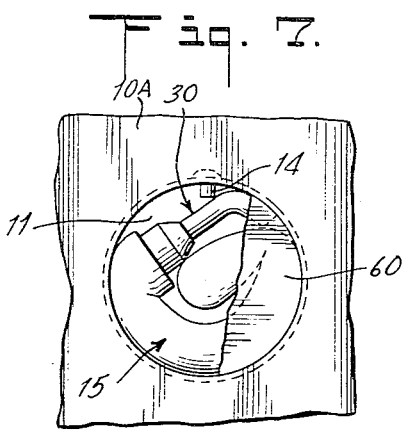
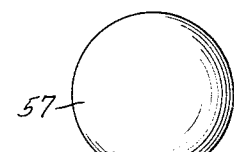
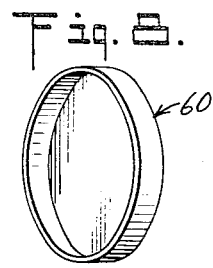
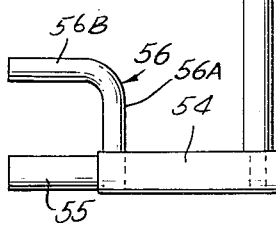
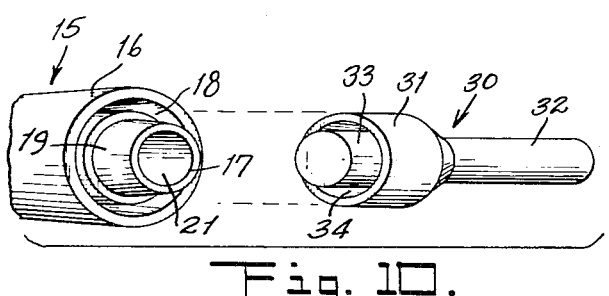

2,752,068

LIQUID DISPENSING DEVICES

Forrest L. Bryant, East Orange, N. J., assignor to Dairymat Corporation, Long Island City, N. Y., a corporation of New York Application May 3, 1952, Serial No. 285,899

5 Claims. (Cl. 222—108)

This invention pertains to the art of sanitary fluid dispensing devices and has for its purpose the provision of a method and means of dispensing food products in measured quantities.

An additional object is the provision of a means which prevents contamination by contact with the human hand.

Another object is the provision of a means including parts which come in contact with the food products that are low in cost so that they may be discarded thereby providing single service.

Still another object is the provision of a means which will meet with the sanitary requirements of health authorities throughout the country for dispensing fluids such as milk.

The need for a sanitary, inexpensive means for this purpose has resulted in many health authorities insisting on milk being served from individual half-pint containers to the public. This results in a greatly increased cost of distribution and when passed on to the consumer reduces the potential consumption of this most important food product.

Other objects and advantages will become apparent as the description proceeds.

Referring to the drawings:

Figure 1 is a side elevation of my invention assembled with a container from which fluid is to be dispensed.

Figure 2 is a side elevation on line 5—5 of Figure 1.

Figure 3 is also a side elevation on line 5—5 of Figure 1 with the cover removed showing operating mechanism.

Figure 4 is a front elevation of operating mechanism.

Figure 5 is a side cross section on line 5—5 of Figure 1.

Figure 6 is an isometric view of the catch plate shown in cross section in Figure 5.

Figure 7 is a front elevation showing the dispensing tube in position for transit and also partly broken away, the dust cap.

Figure 8 is an isometric view of the dust cap partly shown in Figure 7.

Figure 9 is a front elevation of the operating handle.

Figure 10 shows an isometric view of the pouring end of the dispensing tube and the cover stopper for same, respectively, left to right.

Figure 11 is an enlarged cross section of the flared cup and outlet end of rubber tube in position with cover cap removed.

Figure 12 is an enlarged cross section of outlet end of rubber tube with cover cap (dotted line) in position.

Referring to the drawings:

The container 10 has the side wall 10A with outside surface 10B. Extending inside the plane of wall 10A and open toward the outside of container 10 is the recess 11 defined by the substantially cylindrical wall 11A and rear wall 11B, wall 11A being substantially perpendicular to wall 10A. Mounted on rear wall 11B is the nipple 12 with bead 13. A pin 14 extends through wall 11A and radially of cylindrical recess 11.

The collapsible, resilient, sanitary rubber discharge tube 15 has a passage 15A therethrough of substantially uniform circular cross section, and has an integral downwardly and outwardly flaring skirt 16 concentrically surrounding its centrally located lower or discharge end portion 17. A channel 18 separates skirt 16 from the radially central end portion 17. The outside surface 19 of end portion 17 tapers radially inwardly toward the extremity.

A first hollow condensate shield 22 has a hollow upper end portion 23 of cylindrical inner shape and upwardly diminishing outer shape. The end portion 17 of tube 15 fits into portion 23, portion 23 further fitting into and filling the channel 18, and skirt 16 thereby overlying the portion 23. The shield 22 is of frustoconical shape, flaring downwardly and outwardly from tube 15.

The stopper plug 30 has a finger grip outer end portion 32 of reduced diameter and concentric inner end portions 31, 33, portion 33 being cylindrical and radially central and being entered in the orifice 21 of end portion 17 of tube 15 to stop the same, while portion 31 is a skirt of cylindrical outer shape and outwardly tapering inner shape complementary to the tapered outer surface 19 of end portion 17, the latter seating snugly in the channel 34 defined by the portions 31, 33.

The catch plate 37 is of substantially flat sheet metal, and has the catch lug 38 struck outwardly, that is, away from conainer 10. The cylindrical flange 39 extends inwardly from plate 37, and snugly fits inside wall 11A of recess 11. Flange 39 is formed with the L-shaped slot 40 which permits flange 39 to pass on both sides of pin 14 and upon slight revolution of plate 37 it then becomes locked in place against the outer surface 10B of wall 10A parallel to portion 10C thereof surrounding recess 11.

The block 50 is held on plate 37 by screws 51 and shield 22 is held on block 50 by the screw 28. Block 50 has a substantially quarter cylindrical convex surface 52 extending downwardly and outwardly from container wall 10A substantially from the height of the bottom of nipple 12. The inner end portion 15B of tube 15 is engaged on nipple 12 and the tube is then led over surface 52 and into shield 22, and the engagement of tube in shield maintains the former pointing in a downward direction.

The substantially L-shaped operating handle 53 has a foot 54, the extremity 55 of foot 54 constituting a pivot pin of reduced diameter engaged in block 50. An L-shaped arm 56 has a portion 56A mounted on foot 54 and extending thence substantially parallel to the body of handle 53, and a cock portion 56B extending thence parallel to pivot pin portion 55 and in overlying relation to tube 15. A ball shaped weight 57 at the end of handle 53 insures that cock portion 56B will collapse tube 15 when handle 53 is at rest. Block 50 and handle 53 are thus valve parts cooperating selectively to close or open passage 15A of tube 15.

The hollow cover 44 has a downwardly extending overhanging lip portion 45 which engages catch lug 38 to hang the cover in place as shown in Figures 1 and 5, a clearance slot 48 being provided for foot or shaft portion 54 of handle 53.

The floor 46 of cover 44 is inclined from horizontal downwardly toward container 10 and has an upwardly extending flange 47 concentric with shield 22 and in spaced relation therebelow. Flange 47 and the central opening 49 defined by it are smaller than shield 22. A hole 58 is formed in cover 44 adjacent floor 46 and container 10. Floor 46 is thus a second condensate shield and receives condensate dripping from tube 15 and shield 22, the condensate falling outside flange 47 at points removed from hole 49 and draining across floor 46 and out hole 58, well away from any cup or glass receiving milk or other fluid food product from tube 15 through opening 49.

The dust cover 60 is a hollow, shallow cylindrical form of sheet metal, open on one end.

In operation the preferred procedure is as follows, when used for dispensing milk.

The container 10, Figure 1, would be washed, and sterilized at the milk pasteurizing plant. The rubber milk dispensing tube 15 is removed from its sanitized wrapping and applied to the container 10 engaging nipple 12 (Figure 5). The stopper 30 is inserted in the end portion 17 of tube 15 at time of fabrication. The dispensing tube 15 and stopper 30 are coiled and placed in recess 11 and covered with dust cap 60, as shown in Figure 7. The container 10 is then filled with milk. The milk and container are then delivered to the customer (usually a restaurant). When the customer receives the container (which may be the insulated type) it is placed in position for serving milk. The dust cap 60 Figure 8 is removed and the rubber dispensing tube then protrudes horizontally from the container 10. The catch plate 37 Figure 5 is then passed over the tube 15 and the flange 39 enters the recess 11 in container 10. The tube 15 and the plug 30 are then guided over the block 50 and through the shield 22 and fitted snugly therein as shown in Figure 11. The plug 30 is still in position as shown in Figure 5. The operating handle 53 is placed in position, its reduced portion 55 being carried by block 50 Figure 5. It is allowed to rest on tube 15 as shown in Figure 5. The cover 44 is then hung on the catch lug 38. The plug 30 is grasped by its reduced portion 32 and pulled out of the tube 15. The dispenser is now ready for use. Lifting the handle 53 causes milk to discharge through tube 15 and releasing handle 53 shuts off the flow of milk by collapsing tube 15 against block 50, as shown in full and broken lines respectively in Figure 5.

When the container is empty the customer removes the cover 44, the operating handle 53, and the catch plate 37. He then removes the rubber dispensing tube 15 and destroys the same. The container is then returned to the dairy and the same procedure repeated. Thus is provided a sanitary economical and practical means and method of dispensing liquid food products.

What I claim as new and patentable is:

1. Dispensing means for a liquid food container, comprising, in combination with the container body and an outlet nipple operatively connected to a side wall thereof, a catch plate, interlocking means on said catch plate and on said wall for holding said catch plate against the outside surface of said wall, a block mounted on said catch plate and having a substantially quarter cylindrical convex surface extending downwardly and outwardly from said container wall substantially from the height of the bottom of said nipple, a collapsible resilient sanitary tube connected to said nipple and led over said surface of said block, means on said block engaging the lower end of said tube and maintaining the same in a downward pointing direction, and an L-shaped operating handle, the extremity of the foot of said handle constituting a pivot pin engaged in said block, said handle further comprising an L-shaped arm mounted on said foot and having a portion extending therefrom parallel to the body of said handle and further having a cock portion extending thence parallel to said pivot pin portion and in overlying relation to said tube, said handle collapsing said tube against said quarter cylindrical convex surface of said block in the position of rest of said handle, and the contents of said container discharging through said tube when said handle is lifted.

2. A liquid food dispenser having a side wall, said side wall being formed with a recess located inside the plane of said wall and open toward the outside, said recess being defined by a rear wall and at least one side wall substantially perpendicular to the plane of said wall of said container, said rear wall having an outlet nipple, a collapsible, resilient discharge tube connected to said nipple, a catch plate, valve parts mounted on said catch plate and engaging said tube, and interengaging means on said side wall of said recess and on said catch plate for detachably locking said plate against the outside surface of said wall of said container.

3. Sanitary dispensing means for liquid food products, comprising, in combination with a container having an outlet nipple, a resilient collapsible tube operatively engaged with said nipple, valve means mounted in operative relation to said tube and operative to close the same by collapsing the same, a truncated conical condensate shield mounted on said valve means, the lower end portion of said tube being entered in the upper end portion of said shield, said tube further having an integral skirt at its lower end portion overlying said upper end of said shield, said dispensing means further having a second condensate shield mounted below said first shield and inclined from horizontal, said second shield having an upwardly extending flange defining an opening located concentrically below said first shield and smaller than said first shield whereby condensate from said tube is led by said first shield to locations outside the opening in said second shield and then led by said second shield away from the stream of liquid dispensed by said tube through said opening in said second shield.

4. Sanitary dispensing means for liquid food products comprising, in combination with a container having a side wall and means continuous with said side wall and defining a rear wall and a substantially cylindrical side wall of a recess open into the plane of said side wall of said container, a catch plate extending in a plane parallel to the portion of said container wall adjacent said recess and having a substantially cylindrical flange engaging said cylindrical wall of said recess to support said catch plate substantially in contact with said container wall, said rear wall of said recess having an outlet nipple for the contents of said container, a collapsible resilient discharge tube engaged with said outlet nipple, tube collapsing means mounted on said catch plate and engaging said tube to selectively collapse said tube to close the same and to release said tube to discharge the contents of the container, a first condensate shield of downward and outward flaring shape fixedly mounted from said catch plate, said tube having at its lower end and integral with the body thereof a radially central portion entering said shield and a skirt portion overlying the upper end portion of said shield; and a hollow cover detachably engaging said catch plate and enclosing said tube, said tube collapsing means and said shield; said cover further having a floor portion extending in a plane inclined from horizontal and in spaced relation below said first condensate shield and constituting a second condensate shield, said floor portion having a flange portion extending upwardly and defining an opening concentric with and smaller than said first condensate shield, whereby condensate from said tube is led by said first shield to points outside the opening in said second shield, and led by said second shield to a location remote from said opening in said second shield, the contents of the container passing from said tube through said opening in said second shield and said cover being formed with an opening adjacent said floor portion and condensate draining off said inclined floor portion and through said opening of said cover.

5. A sanitary discharge tube for dispensing liquid food products from a bulk container having as outlet an outlet nipple, said tube being collapsible and resilient and having an inner end portion engageable with said outlet nipple, said tube further having an outer end portion comprising an integrally central portion and an outer concentric flaring skirt portion, a channel being defined between said inner and outer portions, said central portion further being formed with an outer surface diminishing radially inwardly toward the extremity of said portion, said tube further comprising a stopper plug, said stopper plug having a cylindrical portion entered in the orifice of said central portion to close the same, said plug further having a skirt portion, the outside surface of said skirt portion being substantially cylindrical and the inside surface of said skirt portion being complementary to said tapered outer surface of said central portion and jointly with said cylindrical portion of said plug defining a channel in which said tapered extremity portion of said central portion is snugly seated, said stopper plug further having a reduced outer end portion by which it may be grasped and removed from said tube.

References Cited in the file of this patent

UNITED STATES PATENTS

| | | |
|---|---|---|
| 910,015 | Olson et al. | Jan. 19, 1909 |
| 2,117,747 | Smith et al. | May 17, 1938 |
| 2,337,257 | Levingston | Dec. 21, 1943 |
| 2,377,261 | Norris | May 29, 1945 |
| 2,549,207 | Kestenbaum | Apr. 17, 1951 |
| 2,601,319 | Norris et al. | June 24, 1952 |